Oct. 13, 1931.  J. L. ANDERSON  1,827,697
TORCH
Filed Oct. 5, 1929   2 Sheets-Sheet 2
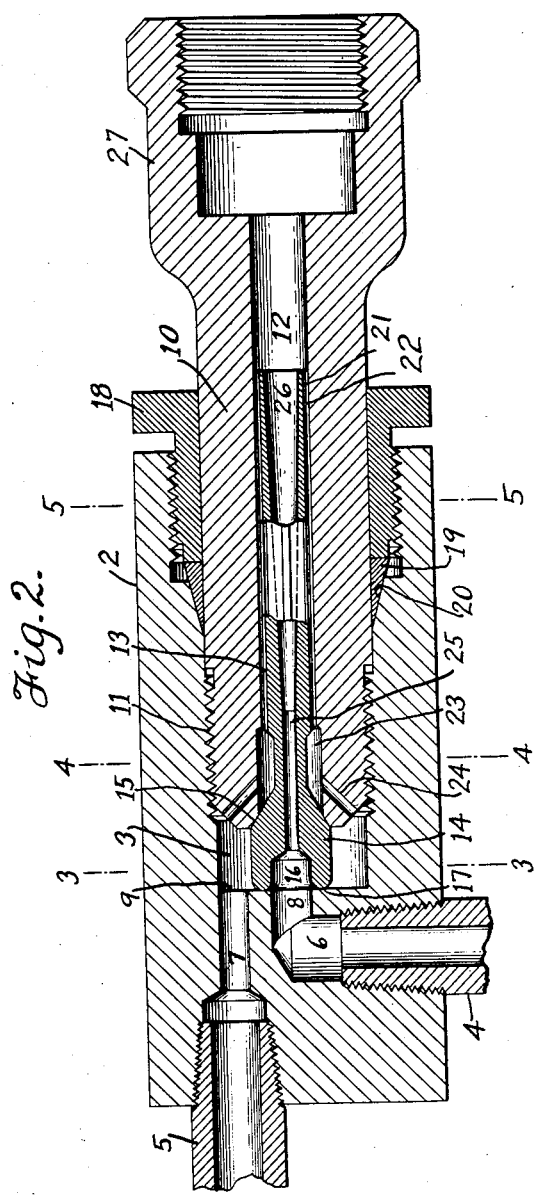
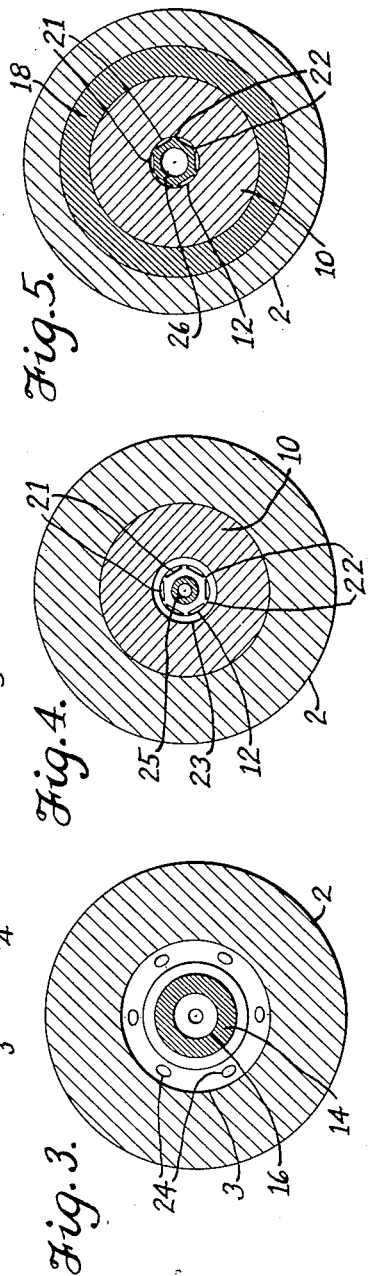
INVENTOR
James L. Anderson
BY
ATTORNEY Patented Oct. 13, 1931

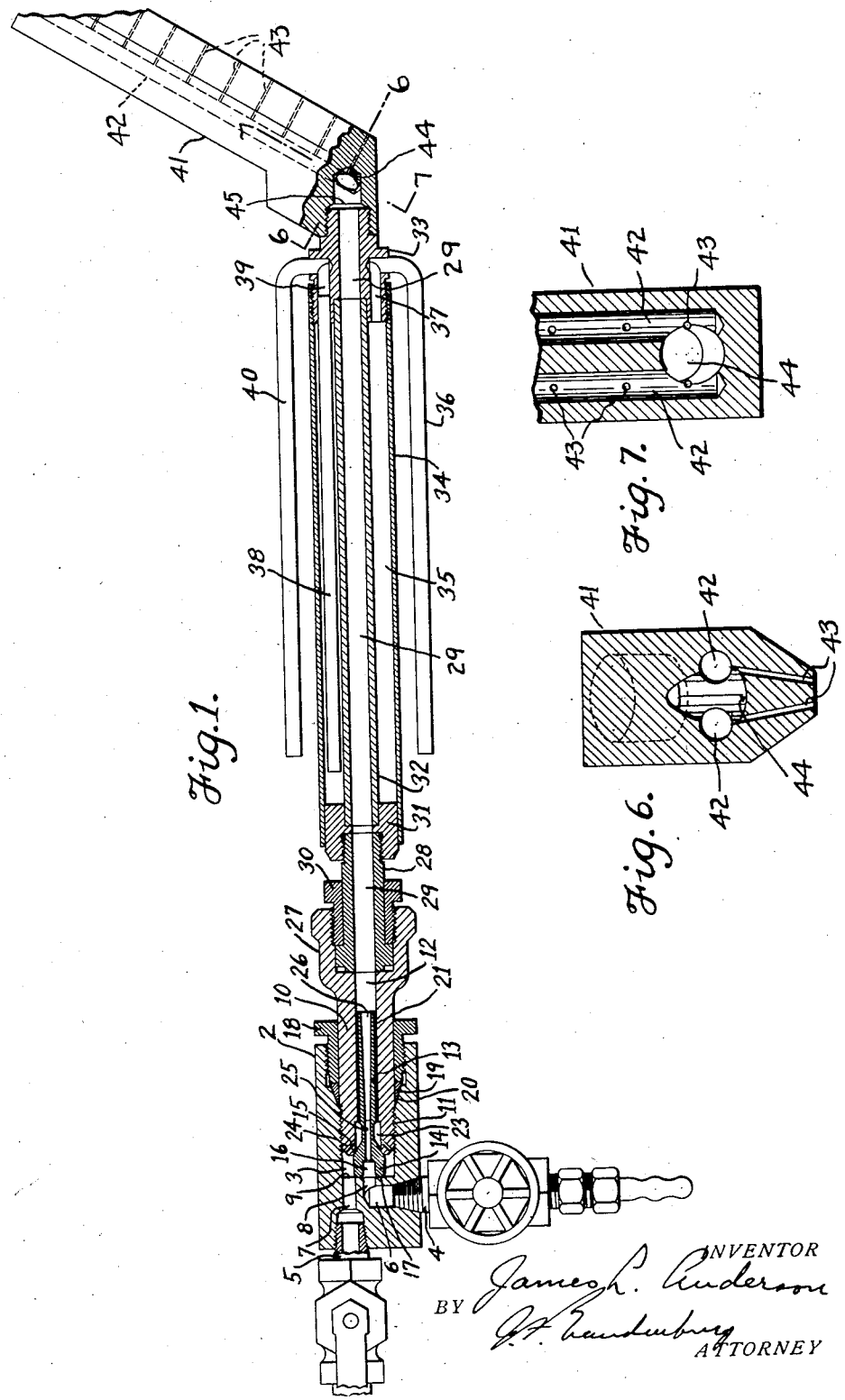

1,827,697

UNITED STATES PATENT OFFICE

JAMES L. ANDERSON, OF TENAFLY, NEW JERSEY, ASSIGNOR TO AIR REDUCTION COMPANY, INCORPORATED, OF NEW YORK, N. Y., A CORPORATION OF NEW YORK

TORCH

Application filed October 5, 1929. Serial No. 397,542.

This invention relates to torches burning oxygen and hydrocarbon gas both under pressure, typically oxyacetylene torches. It is more particularly concerned with welding torches, and especially with machine welding torches burning large quantities of gas in multiple jets.

Among the objects of the invention is the provision of a torch the plan of which is such as to permit large consumption of these explosive mixtures, to obviate costly interruption of operations by flashbacks, and to secure advantageous mixture conditions. Another object having to do with the employment of a tip member which is provided with two (or more) distributing passages each supplying numerous jet passages, is to insure even supply of the mixture to the respective distributing passages so that each set of jets is properly fed. Further objects are economy in the manufacture of the torch, its ability to withstand severe usage, and facilities for disassembling and re-assembling. Other features of the invention will become apparent to those skilled in the art.

In the accompanying drawings forming part hereof:

Fig. 1 is a view partly in longitudinal section and partly in elevation of a torch embodying the invention, a portion of the tip block being broken away;

Fig. 2 is an enlarged longitudinal section through the rear part of the torch;

Figs. 3, 4 and 5 are cross-sections taken on the lines 3—3, 4—4 and 5—5, respectively, of Fig. 2;

Fig. 6 is a section taken on the line 6—6 of Fig. 1; and

Fig. 7 is a section taken on the line 7—7 of Fig. 1.

The torch which is the illustrated embodiment of the invention has a rear end body 2 formed with a cavity 3 extending inward from its forward end. Valved connections 4 and 5 are for the oxygen and acetylene supply lines, respectively. Oxygen and acetylene supply passages in the body are marked 6 and 7. The oxygen supply passage has an outlet 8 opening centrally through the back wall of the cavity 3, and the acetylene supply passage has an outlet 9 also opening into the cavity.

A tubular member 10 is inserted into the cavity from the front, this member being preferably provided with screw-threads 11 engaging screw-threads in the cavity.

The member 10 has a large cylindrical bore 12 which may be enlarged at the rear end.

An inner tube 13 is slipped or fitted into the bore of the member 10 from the rear, this tube having an enlarged rear head 14 which projects rearwardly from the member 10. This head has a sloping or conical sealing surface 15 against which the rear end of the member 10 is formed to bear in a manner insuring a gas-tight joint at this region.

The rear end of the head 14 contains an entrance chamber 16 to register with the oxygen opening 8, and is rounded so as to bear in a gas-tight manner at 17 against the back of the cavity 3 around this opening.

By screwing the member 10 tightly into the body 2 pressure is produced which makes effective the two seals at 15 and 17. A bushing 18 screwed into the forward end of the body 2 and compressing a tapered ring 19 against a beveled surface 20 makes a third gas-tight joint.

The outside of the tube 13 is spaced from the bore of the member 10 so as to leave a straight, narrow leading passage or passages 21 for the fuel gas, this passage being preferably subdivided by centering ribs 22. The tube 13 may have an externally reduced neck, around which is a distributing chamber 23 for the acetylene admitted through metering ports 24 which may be drilled diagonally through the rear end of the member 10, placing the said chamber in communication with the acetylene space in the cavity 3.

The tube 13 has a comparatively restricted rear bore 25 forming an oxygen metering port. Extending forwardly from this port the passage 26 through the tube is made gradually divergent, for a relatively long distance, the divergence extending up to the open forward end of the tube, or the passage at least being not restricted after its divergence.

The passages 21 and 26 are designed, in connection with the ports 24 and 25, to pass the requisite proportions and amounts of the two gases, and the gentle divergent taper of the passage 26 is calculated to reduce the velocity of the oxygen so that it is delivered from the end of the tube at the same, or very nearly the same, velocity as the surrounding stream or streams of acetylene.

The two gases are thus delivered and associated in longitudinal flow in the bore 12 beyond the open end of the tube 13, this portion of said bore forming the rear end of a long conduit, which is unobstructed up to its forward end, or for a very considerable distance.

It is to be understood that the torch is of the positive-proportioning class, as distinguished from the "injector" type of torch. In the injector type of torch a jet of high pressure gas entrains the other gas at no or low pressure. The amount of the low pressure gas is then dependent upon the velocity of the entraining gas, and that in turn on the driving pressure behind the entraining gas. Such torches have limitations in respect to accurate proportioning, since if the pressure on the entraining gas is varied the rate at which low pressure gas is entrained does not change in strict proportion.

Positive-proportioning torches are so designed that each of the gases is forced under its own active pressure to a point where they meet in definite proportions determined by the respective pressures and the sizes of the ports of the proportioning device. The proportioning devices of such torches are usually called mixers since they commingle the gases at the point of mutual encounter, whereas in the torch of the present invention the contrary is sought. To minimize immediate commingling is not entirely new, and needless to say some commingling between the parallel flowing streams does occur, but here the gases are associated in parallel flow and at substantially equal velocities, by the herein described means specially designed to that end. Furthermore, the stratified gases so associated are conducted for a long distance in that relation, migrating into each other very gradually as they proceed, but not mixing in the sense of an explosive mixture until at the end of this substantially straight-away flow they encounter an abrupt baffling, which produces an actual but still incomplete mixing, after which they are distributed, with further mixing, in a multi-jet tip.

The forward end of the member 10 is formed with an enlarged socket 27 into which is inserted the shouldered rear end of a thimble 28, the bore 29 of which is a continuation of the bore 12. A bushing 30 screwed into the socket 27 clamps the thimble 28 detachably.

Onto the forward end of the thimble 28 a head-piece 31 is screwed and soldered. The rear end of a pipe 32 is soldered into this piece, and a forward head-piece 33 is soldered to the front end of the same pipe. The passage 12, 29 is continued substantially without break through the head-pieces 31 and 33 and the pipe 32.

A sleeve 34 is tightly secured to the head-pieces 31 and 33 to enclose a water-jacket space 35 surrounding the pipe 32. A water supply pipe 36 is connected with this space through a passage 37 in the head-piece 33. An internal outlet pipe 38 projects from another passage 39 in this head to a point near the rear end of the water chamber, and communicates with an external connection 40.

The head-piece 33 is connected with a tip piece, specifically a multiple jet machine welding tip block 41.

This tip member is set at an angle to the main conduit of the torch, as is customary in multiple jet machine welding torches, and is of a length to accommodate a great multiplicity of jets extending lengthwise of the seam to be welded. The tip is preferably of that type adapted to deliver a laterally spread, as well as seamwise extended, collection of preheating and welding jets, and may contain two parallel longitudinal distributing passages 42, each supplying numerous fine jet passages 43 which open through the under face of the tip block, and the jet orifices of which may be arranged in pairs or rows or otherwise.

The large conduit passage 29 is continued into the upper rear portion of the member 41 and is there headed off by a substantially dead end face 44. The gases are thereby abruptly baffled and the streams previously more or less stratified are commingled, this forward portion of the conduit constituting a mixing chamber 45 where turbulence is definitely produced.

The distributing passages 42 are drilled so as to communicate directly with this region somewhat above the end face 44, and in the case of two such passages they are arranged so that their rear ends break through opposite sides of the mixing chamber at the end of the main conduit. In this way the gases are more evenly divided between the distributing passages than was the case in former tips which I have patented wherein two distributing passages have been connected with the end of a main conduit by leading passages.

The present invention is not necessarily limited, however, to the number of distributing passages in the tip member. As far as other aspects of the invention are concerned there may be any greater number of distributing passages, with any desired arrangement of jets, or there may be a single distributing passage with one or more series of jet passages intersecting it, as disclosed in my prior patents.

In this torch I have sought to secure very high linear speeds of welding, or to make possible the welding at economical working speeds of quite heavy sheet or plate material, by providing for very heavy consumption of gases. Such consumptions increase the seriousness of flashbacks, and the character of the work and the operating economies desired make it particularly necessary to avoid interruptions likely to spoil the product. The general plan of this torch is to associate the gases substantially without turbulence, by means of a positive proportioning device, the point where the gases are first associated being very remote from the region of intense heat where they are burned and where the welding is performed, to conduct the gases in substantially concentric or stratified flow through a long conduit in which there is preferably little or no influence tending to produce turbulence, and to produce turbulence more deliberately at the point of initial distribution. In this torch backfires may, of course, occur, but they will proceed only to the region of definite mixing, which is located well forward, and the torch will instantaneously re-light.

The gases in their flow through the long main conduit 29 commingle gradually, and the walls of this conduit need not necessarily be perfectly straight and smooth so long as the provisions are such that the gases are conducted far enough from the point of initial association before they mingle sufficiently to permit the rearward propagation of a backfire. The best results are obtained by observing these conditions and by compelling intermixture at or shortly before the point where the gases enter the distributing passage or passages of the multiple jet tip member.

In this connection it may be stated that it is not necessarily desirable to produce the most thorough and uniform mixing of the gases just before they are finally distributed. I have found that great advantage in respect to linear speed of welding is secured if the forward or preheating jets have a slight excess of oxygen and the rearward jets a slight excess of carbon, or stated otherwise, if the proportion of oxygen in the composition of the jets increases moderately and gradually from rear to front of the seamwise extended collection of jets, while, conversely, the proportion of carbon in the jets increases from front to rear. More oxygen in the flames greatly increases the heat, and therefore the welding speed, and as long as these flames are not those which do the actual fusing and welding, the metal is not burned; likewise the excess of carbon, if any, in the rearmost flames, is not sufficient to render the metal of the weld brittle. This is not fundamentally at variance with the general conception that a neutral welding flame is the best. In these torches we deal with a multitude of jets having somewhat differentiated functions, and the fact is that a comparatively small overplus of oxygen in the forward jets makes possible an extraordinary speeding up of the welding operation without detriment to the metal.

The plan of the present torch is such that this advantage is secured. For some reason which I will not undertake to explain it appears that with the gases entering the distributing passages in a state of mixture a little less than complete, the oxygen has somewhat more of a tendency to seek the forward end of the tip member and the acetylene the rear end, the difference in the mixtures delivered from the series of jet orifices being properly regulated by the design.

This effect has been present in my prior multiple jet machine welding tips, but in those tips and torches the gases were introduced to each other in such manner as to cause them to mix the gases were conducted as a mixture to the tip block, the passage of moderate length through which the gases were thus led constituting a mixing chamber. In the present torch I burn much greater quantities of gases, the gases are brought together very much farther away from the tip block and in such manner that they mingle only slightly at this point, and they are caused to flow together for a long distance before they are mixed sufficiently to be susceptible to a back-fire. At or near the point of initial distribution, turbulence and mixing are caused by suitable means, as by baffling or dead-ending the main conduit, or by the abrupt change of direction from the main conduit to the distributing passages, and preferably by both. The mixing continues, of course, in the distributing passages and in the jet passages. By reason of the novel features of the present torch it is possible not only to eliminate or very greatly reduce the hazard of sustained flash-backs when handling such large volumes of gases, but also to effect a better and more deliberate control of differentiated proportions of two gases in the various jets.

It will be understood that the tip block may be and preferably should be provided with suitable water-cooling. As such provisions are known it has not been thought necessary to illustrate them.

While the preferred and more particularly contemplated embodiment of the invention has been described in detail, it will be evident that the form may be modified without departing from essentials. The invention is more especially designed for application to welding torches, but features herein set forth might be employed in cutting torches.

I claim:

1. A positive-proportioning oxyacetylene torch, having supply passages for oxygen and fuel gas respectively, a long conduit, a tip member connected with said conduit, a tube in rearward continuation with said conduit and in communication with said fuel gas supply passage, and an inner tube in communication with said oxygen supply passage, said tubes forming between them a fuel gas passage surrounding the oxygen gas passage through the inner tube, said oxygen gas passage enlarging gradually to its forward open end where the two gases are separately delivered to said conduit.

2. In a positive-proportioning oxyacetylene torch having supply passages for oxygen and fuel gas respectively, and a conduit for the two gases, means for leading the gases separately in proper proportions to said conduit, said means comprising inner and outer tubes forming between them the fuel gas passage, said inner tube being formed with a gradually enlarging bore adapted to deliver the oxygen at substantially equal velocity with the fuel gas.

3. In a positive-proportioning oxyacetylene torch having supply passages for oxygen and fuel gases respectively, means for leading the gases separately in proper proportions and for associating them without turbulence, said means comprising inner and outer tubes forming between them a straight fuel gas passage, said inner tube being formed with a gradually enlarging bore adapted to deliver the oxygen at substantially equal velocity with the fuel gas, a conduit extending without obstructions for a considerable distance from the point where the gases are thus separately delivered, and a tip member connected with said conduit.

4. A positive-proportioning oxyacetylene torch comprising a multiple jet welding tip member provided with a distributing passage, a positive proportioning device remote from said tip adapted to associate the gases without turbulence, a long conduit adapted to conduct the gases thus associated to said tip member, and means for producing pronounced turbulence in the gases within the forward end of said conduit which is in communication with said distributing passage.

5. A positive-proportioning oxyacetylene torch comprising a multiple jet tip member disposed at an angle to the hereinafter-mentioned conduit and provided with a distributing passage extending lengthwise of the member, a positive proportioning device having parallel passages for leading the two gases separately and delivering them at substantially equal velocities in such manner that the gases are associated in parallel streams without turbulence, the point where the streams are first associated being remote from the tip member, a long conduit adapted to conduct the gases thus associated to the tip member, and means at the forward end of said conduit for producing definite turbulence in the gases which then enter said distributing passage.

6. In a positive-proportioning multiple jet oxyacetylene welding torch, the combination of a main conduit for conducting the gases, an elongated multiple jet tip member disposed at an angle to said conduit and provided with two distributing passages each extending lengthwise of the member and each supplying numerous jet passages, the forward end of said conduit being substantially blocked and said distributing passages being in direct communication with said conduit and so arranged as to break into opposite sides thereof.

7. A positive-proportioning multiple jet oxyacetylene welding torch comprising means for associating the gases without turbulence at a point remote from the region of consumption, means for conducting the associated gases for a considerable distance substantially stratified, means for abruptly but not perfectly commingling the gases at or before the point of distribution, and means for then distributing the gases to numerous jets of a seamwise extended collection in such manner that the forward jets are slightly richer in oxygen and poorer in carbon whilst the rearward jets are slightly richer in carbon and poorer in oxygen.

8. In a positive-proportioning oxyacetylene torch, a body having supply passages for oxygen and fuel gas respectively, said body formed with a cavity, a tubular member inserted rearwardly into said cavity, an inner tube inserted forwardly into said tubular member and having an enlarged projecting head, said head formed with a sealing surface cooperating with the rear end of the tubular member and with a sealing rear extremity bearing against the back of the cavity around the outlet of one of said supply passages, said tube and tubular member forming between them a passage for leading the other gas to a point where the gases join each other, and means reacting between said body and said tubular member to form successively a tight seal between the tubular member and the head of the inner tube and between said head and the back of the cavity.

JAMES L. ANDERSON.